United States Patent
Navsariwala et al.

(10) Patent No.: US 10,031,238 B2
(45) Date of Patent: Jul. 24, 2018

(54) GEOLOCATION ANTENNA SYSTEM

(71) Applicant: MOTOROLA MOBILITY LLC, Chicago, IL (US)

(72) Inventors: Umesh D. Navsariwala, Bartlett, IL (US); Mohammed Abdul-Gaffoor, Palatine, IL (US); Prem K. Ganeshan, Arlington Heights, IL (US); Richard Muryanto, Elk Grove Village, IL (US); Hariharan Muthukrishnan, Mount Prospect, IL (US)

(73) Assignee: Motorola Mobility LLC, Chicago, IL (US)

( * ) Notice: Subject to any disclaimer, the term of this patent is extended or adjusted under 35 U.S.C. 154(b) by 397 days.

(21) Appl. No.: 14/748,336

(22) Filed: Jun. 24, 2015

(65) Prior Publication Data

US 2016/0377733 A1 Dec. 29, 2016

(51) Int. Cl.
*G01S 19/46* (2010.01)
*G01S 19/49* (2010.01)

(52) U.S. Cl.
CPC .............. *G01S 19/46* (2013.01); *G01S 19/49* (2013.01)

(58) Field of Classification Search
USPC .................................................. 342/357.29
See application file for complete search history.

(56) References Cited

U.S. PATENT DOCUMENTS

| | | | |
|---|---|---|---|
| 9,124,333 B1* | 9/2015 | Mansour | H04B 7/10 |
| 2002/0045427 A1* | 4/2002 | Lahti | H04B 7/0822 |
| | | | 455/97 |
| 2003/0125078 A1* | 7/2003 | Hong | H04B 1/406 |
| | | | 455/556.1 |
| 2007/0146211 A1 | 6/2007 | Abdul-Gaffoor et al. | |
| 2009/0135060 A1* | 5/2009 | Lennen | G01S 19/22 |
| | | | 342/357.31 |
| 2009/0256759 A1* | 10/2009 | Hill | H01Q 1/243 |
| | | | 343/702 |
| 2012/0202560 A1* | 8/2012 | Donaldson | H04M 1/6066 |
| | | | 455/552.1 |
| 2012/0290252 A1 | 11/2012 | Abraham | |

FOREIGN PATENT DOCUMENTS

EP    1860404 A1    11/2007

OTHER PUBLICATIONS

BMS, A Cohu Company, BMS wireless RX solutions, May 17, 2013.

* cited by examiner

*Primary Examiner* — Gregory C. Issing
*Assistant Examiner* — Helena H Seraydaryan
(74) *Attorney, Agent, or Firm* — Miller, Matthias & Hull LLP

(57) ABSTRACT

Systems and methods for improved Global Positioning System ("GPS") function employ two multiband, multiport antennas to receive GPS signals. The antennas also serve WiFi frequencies, and the system utilizes the received WiFi signal strength to correct the GPS reception pattern for detuning due to user contact or other factors. The correction is made via selective combination of the GPS signals from the antennas. In addition, a phase shifter in one of the signal paths is used to account for changes in device orientation and to maximize the upper hemisphere component of the GPS reception pattern.

20 Claims, 6 Drawing Sheets

GEOLOCATION ANTENNA SYSTEM

TECHNICAL FIELD

The present disclosure is related generally to geolocation techniques and, more particularly, to a system and method for enhancing Global Positioning System ("GPS") antenna performance in a mobile communications device.

BACKGROUND

Cellphone users rely on their devices for a wide range of services every day, from communication to entertainment. Indeed, the cellular infrastructure has expanded to the point that no matter where the user is, there is probably cellular service. However, sometimes the precise location of the user still matters a great deal.

More than a decade ago, cellphone users acquired the ability to determine their location on the earth's surface via GPS, and now an entire class of services uses GPS and other location technologies to enhance the user experience. This class of services, referred to as "location-based" services, includes customized search options, navigational assistance, locality-based advertisements and suggestions, and so on.

Typically, WiFi networks and GPS and are used to provide location data for location-based services. WiFi networks are typically short range, such that a device's presence on a particular WiFi network serves to roughly resolve the device's location. For greater accuracy, GPS operates by calculating a device's location relative to multiple earth-orbiting satellites.

However, since GPS satellite signals may be attenuated, it is important that a device be able to accurately and reliably capture such signals. For a single GPS antenna on a device, the GPS signal strength is impacted differently by different mechanical modes of use, e.g., free space, head and hand, hand only, etc. Moreover, for consistent performance, GPS Upper Hemisphere Isotropic Sensitivity performance specifications should be met regardless of the mechanical use mode (e.g., both left and right head and hand).

Typically, however, the location of the GPS antenna on the device is largely determinative of the device's GPS performance in various orientations and user-handling conditions. While it is possible to implement an antenna placement that balances performance between left and right side of the head, such a solution would necessarily represent a compromise with respect to performance in any given mode. Also, such an antenna placement may interfere with the placement of other antennas.

It is also possible to employ switched GPS antennas, that is, to use multiple GPS antennas and switch between these antennas based on additional input, e.g., data from an accelerometer. This technique would provide some degree of adaptability of the radiation pattern to suit different usage conditions but would not account for user loading of an antenna.

While the present disclosure is directed to a system that can eliminate some of the shortcomings noted in this Background section, it should be appreciated that any such benefit is not a limitation on the scope of the disclosed principles, or of the attached claims, except to the extent expressly noted in the claims. Additionally, the discussion of technology in this Background section is reflective of the inventors' own observations, considerations, and thoughts, and is in no way intended to accurately catalog or comprehensively summarize the prior art. As such, the inventors expressly disclaim this section as admitted or assumed prior art with respect to the discussed details. Moreover, the identification herein of a desirable course of action reflects the inventors' own observations and ideas and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
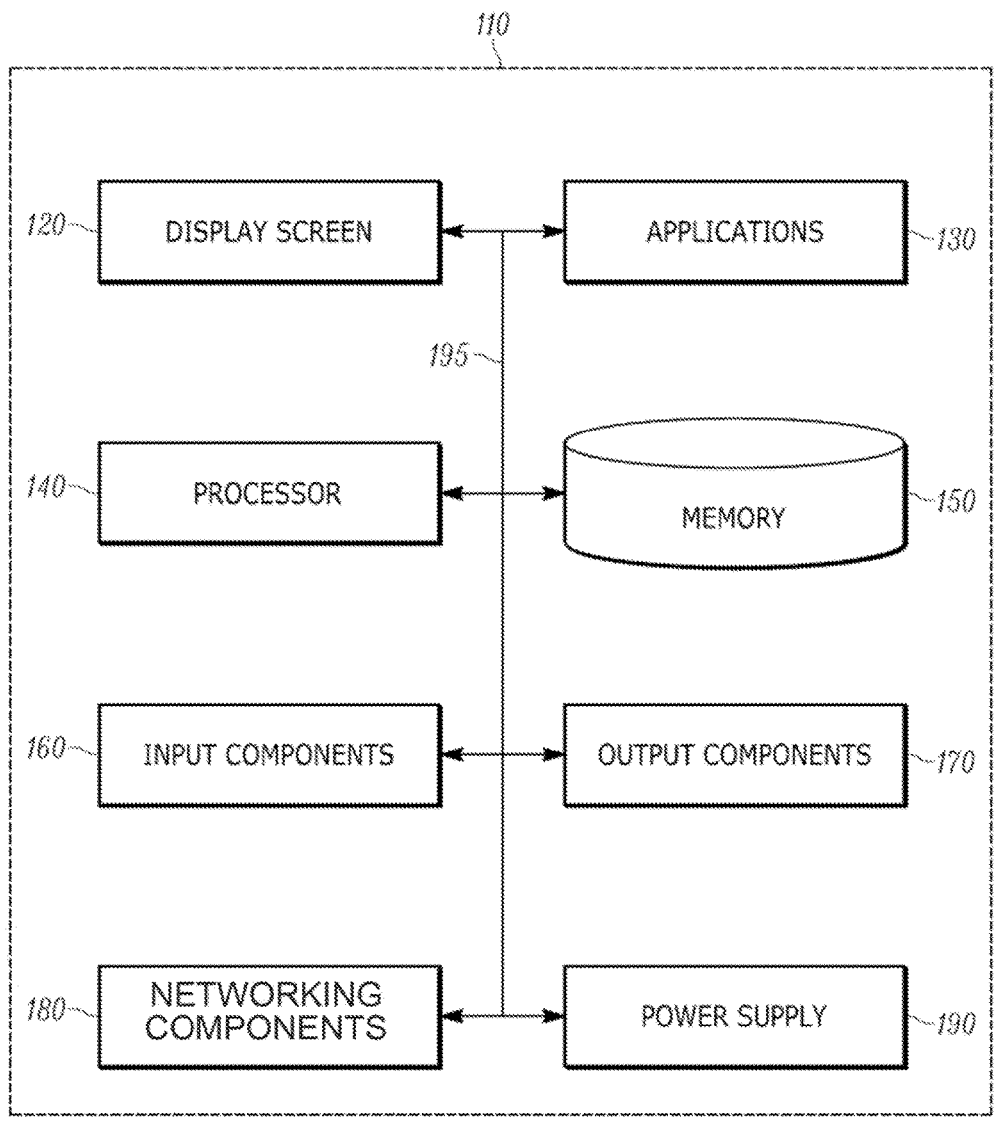
FIG. 1 is a simplified schematic of an example device with respect to which embodiments of the disclosed principles may be implemented.

Before presenting a detailed discussion of embodiments of the disclosed principles, an overview of certain embodiments is given to aid the reader in understanding the later discussion. As noted above, GPS signals are often used to assist in identifying a location of a device, so it is important that the device be able to accurately and reliably capture such signals. Moreover, since a user's manipulation and handling of the device are not predetermined, the device should be able to accurately and reliably capture such signals regardless of the position of the user's head and hand and regardless of the device orientation.

GPS signal strength is affected in different ways by different mechanical user modes, e.g., free space, head-and-hand (left or right), hand-only (left or right), and so on. Despite the differing impact of these modes on GPS signal strength, GPS performance specifications should still be met for each mode. In an embodiment of the disclosed principles, signals from two diplexed multiband GPS antennas also supporting WiFi multiple input/multiple output are combined.

A variable power combiner is used to reduce the impact of an antenna being detuned by user proximity or contact or by the device environment. The GPS signal combining value at any time is based, in an embodiment, on differences in WiFi receiver signal levels for the two antennas, with this difference serving to approximate differences in GPS signal levels. This serves to adapt the system when, for example, the user's grip blocks one of the antennas. A nominal or default combiner value combines power equally from the two antennas, indicating an unloaded (free-space) condition for the device. In addition, in the absence of WiFi signals, the GPS signal combining value may be set to the default value.

In a further embodiment, the GPS reception pattern is steered using a variable phase shifter and a variable RF combiner to maximize an upper hemisphere reception pattern (also referred to as the "skyward" pattern). Nominal or zero phase points the reception pattern toward the top of the device. Other phase values steer the radiation pattern laterally away from the device axis so that the pattern is pointed away from the ground based on accelerometer or gyroscope input.

With this overview in mind, and turning now to a more detailed discussion in conjunction with the attached figures, the techniques of the present disclosure are illustrated as being implemented in a suitable computing environment. The following generalized device description is based on embodiments and examples within which the disclosed principles may be implemented, and should not be taken as limiting the claims with regard to alternative embodiments that are not explicitly described herein. Thus, for example, while FIG. 1 illustrates an example mobile device within which embodiments of the disclosed principles may be implemented, it will be appreciated that other device types may be used, including but not limited to laptop computers, tablet computers, embedded automobile computing systems, and so on.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, component availability, price point, and other considerations.

In the illustrated embodiment, the components of the user device 110 include a display screen 120, applications (e.g., programs) 130, a processor 140, a memory 150, one or more input components 160 such as speech and text input facilities, touch screens, sensors (gyroscope, accelerometers, light sensors, etc.), cameras, and one or more output components 170 such as text and audible output facilities, e.g., one or more speakers.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. The memory 150 may be accessed via a network, e.g., via cloud-based storage. The memory 150 may include a random-access memory. The memory 150 may include a read-only memory (i.e., a hard drive, flash memory, or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory, computer-readable medium (e.g., memory 150) to control basic functions of the electronic device 110. Such functions may include, for example, interaction among various internal components and storage and retrieval of applications and data to and from the memory 150.

Further with respect to the applications, these typically utilize the operating system to provide more specific functionality, such as file-system service and handling of protected and unprotected data stored in the memory 150. Although many applications may provide standard or required functionality of the user device 110, in other cases applications provide optional or specialized functionality and may be supplied by third party vendors or by the device manufacturer.

With respect to informational data, e.g., program parameters and process data, this non-executable information can be referenced, manipulated, or written by the operating system or by an application. Such informational data can include, for example, data that are preprogrammed into the device during manufacture, data that are created by the device or added by the user, or any of a variety of types of information that are uploaded to, downloaded from, or otherwise accessed at servers or other devices with which the device 110 is in communication during its ongoing operation.

Although not shown in detail in FIG. 1, the device 110 includes software and hardware networking components 180 to allow communications to and from the device 110. Such networking components provide wireless networking functionality, although wired networking may be supported. In an embodiment, as noted above, the networking components 180 include a GPS antenna system to improve device-location consistency.

In an embodiment, a power supply 190, such as a battery or fuel cell, may be included for providing power to the device 110 and its components. All or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user interface objects (e.g., toggling through various display icons that are linked to executable applications).

Figure 2:
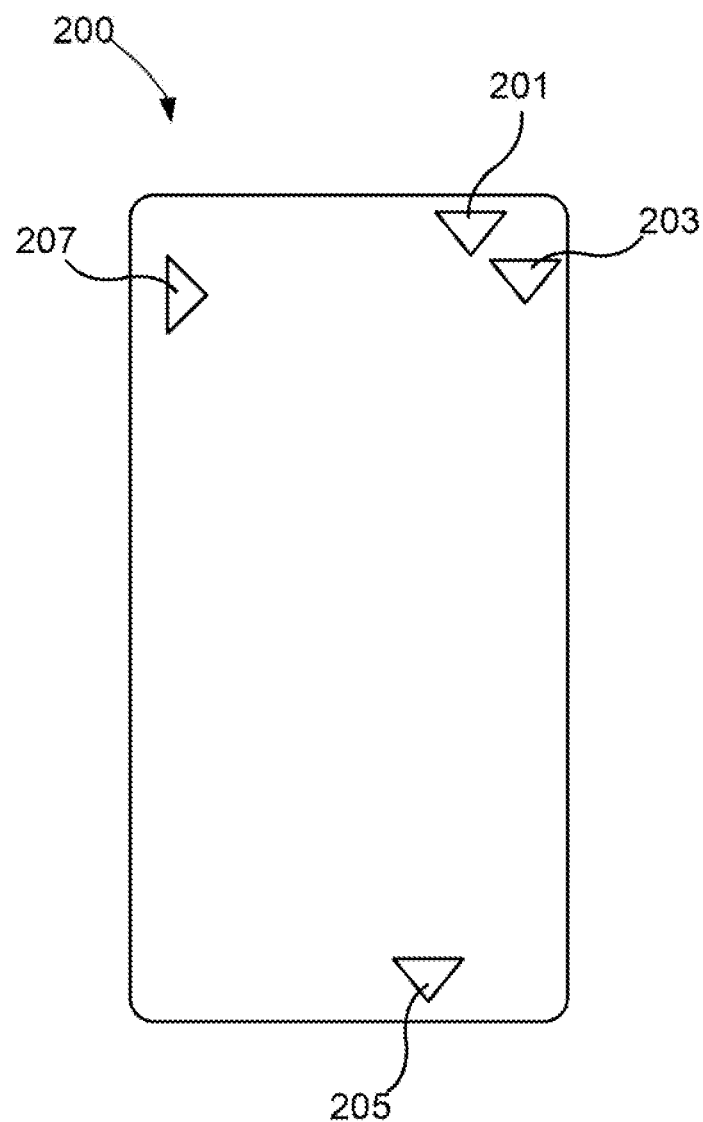
FIG. 2 is a physical layout schematic of the device of FIG. 1 showing antenna placement in keeping with an embodiment of the disclosed principles.

FIG. 2 shows a simplified physical schematic of a device 200 having multiple antennas located in accordance with an embodiment of the disclosed principles. In particular, the device 200 as shown includes three antennas for wireless communication, e.g., via a WiFi medium or cellular medium. These antennas include a first antenna 201, a second antenna 203, and a third antenna 205 in the illustrated embodiment.

In addition, the illustrated device 200 includes a GPS antenna 207. As may be appreciated, the location of the single GPS antenna makes traditional GPS reception vulnerable to interference by the user's head or hand or by other elements in the device environment. However, in an embodiment, one or more of the illustrated communications antennas 201, 203, 205 are used in conjunction with antenna 207 to implement a multiband, multiport antenna system wherein multiple antennas support GPS frequencies and are used to optimize GPS reception. Thus, for example, each of the GPS antenna 207 and the second antenna 203 may be diplexed to interface over WiFi as well as GPS frequencies. With a suitable underlying architecture, as will be discussed in greater detail below, this allows for improved GPS-reception robustness and directionality.

Figure 3:
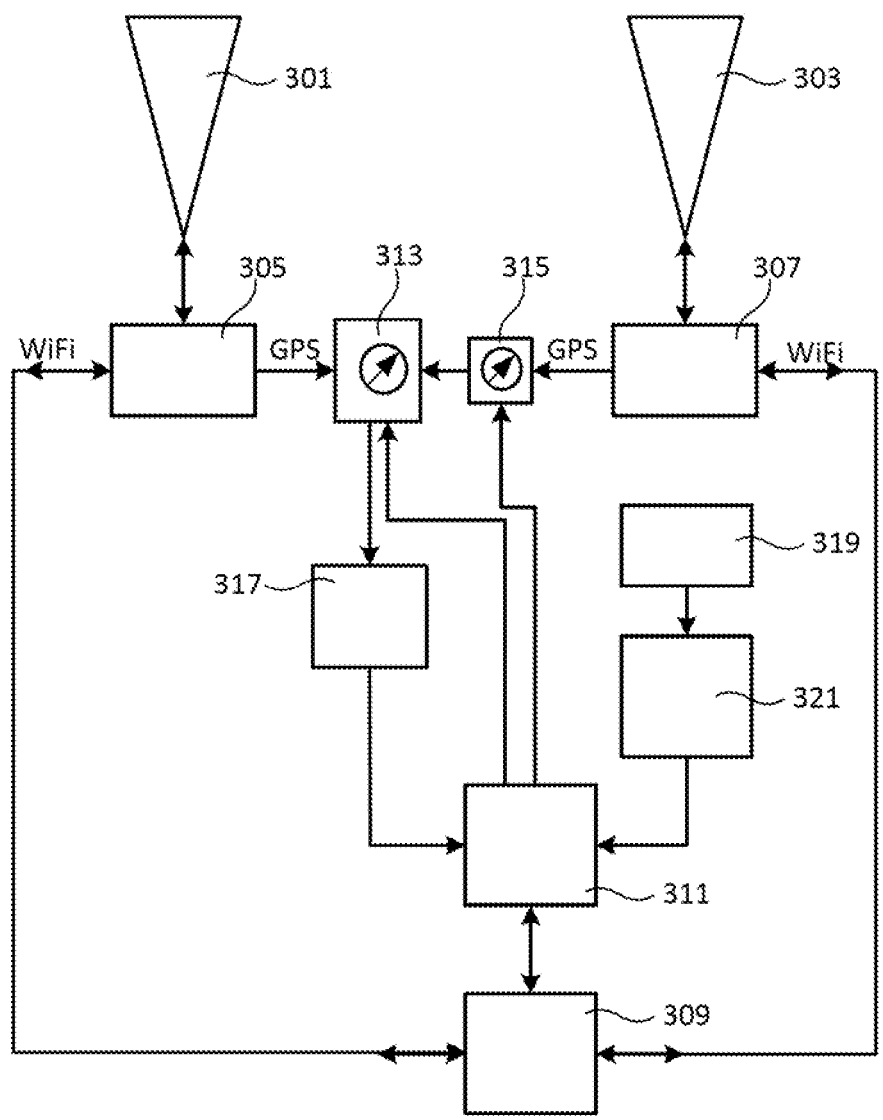
FIG. 3 is a schematic of a radio-frequency ("RF") circuit of a multiband, multiport antenna system within which embodiments of the disclosed principles may be implemented, wherein multiple WiFi antennas support GPS frequencies and are deployed to optimize GPS reception.

FIG. 3 shows a multiband, multiport antenna system wherein multiple WiFi antennas support GPS frequencies as well and are used to optimize GPS reception. The illustrated system includes a first multiband antenna 301 and a second multiband antenna 303. Each multiband antenna 301, 303 is configured to support one or more WiFi frequencies (e.g., 2.4 GHz and 5 GHz) as well as appropriate GPS frequencies (e.g., 1575.42 MHz and 1227.60 MHz).

A respective diplexer 305, 307 interfaces each multiband antenna 301, 303 to the rest of the illustrated circuit. Each diplexer 305, 307 is configured to implement frequency-domain multiplexing. In this way, each multiband antenna 301, 303 supports WiFi frequency communications, but incoming GPS signals can be received and routed separately from incoming WiFi data.

With respect to the diplexers 305, 307, WiFi signals within the circuit are routed to and from a WiFi modem 309, which is communicatively linked with a main processor 311. The main processor 311 may be the processor 140 of FIG. 1 or may be a separate dedicated processor. Moreover, the main processor 311 may comprise a single processor or controller or may comprise multiple such elements.

As noted above, the diplexers 305, 307 route incoming GPS data separately from incoming WiFi data. Incoming GPS data from the first multiband antenna 301 are routed to a variable power combiner 313, while incoming GPS data from the second multiband antenna 303 are routed first to a variable phase shifter 315 and then to the variable combiner 313. The combined GPS signal output by the variable combiner 313 is input to a GPS low-noise amplifier 317, the output of which is provided to the main processor 311 for use in determining the device's location.

The operation of the variable combiner 313 and variable phase shifter 315 were described in overview above, and it may be recalled that the variable combiner 313 offsets the detuning of one or both multiband antennas 301, 303 based on device environment, while the variable phase shifter 315 steers the GPS reception pattern in the skyward direction based on device orientation. As such, the system illustrated in FIG. 3 further includes an orientation-measurement unit 319, which includes an accelerometer or gyroscope (or combination of the two) or other orientation sensor such as a gravitometer. The orientation-measurement unit 319 produces an orientation-related signal which identifies or can be used to derive a device orientation. The orientation-related signal is then input to a sensor processor 321 to form an orientation estimate, which is then provided to the main processor 311 to generate a phase-shift value.

Figure 4:
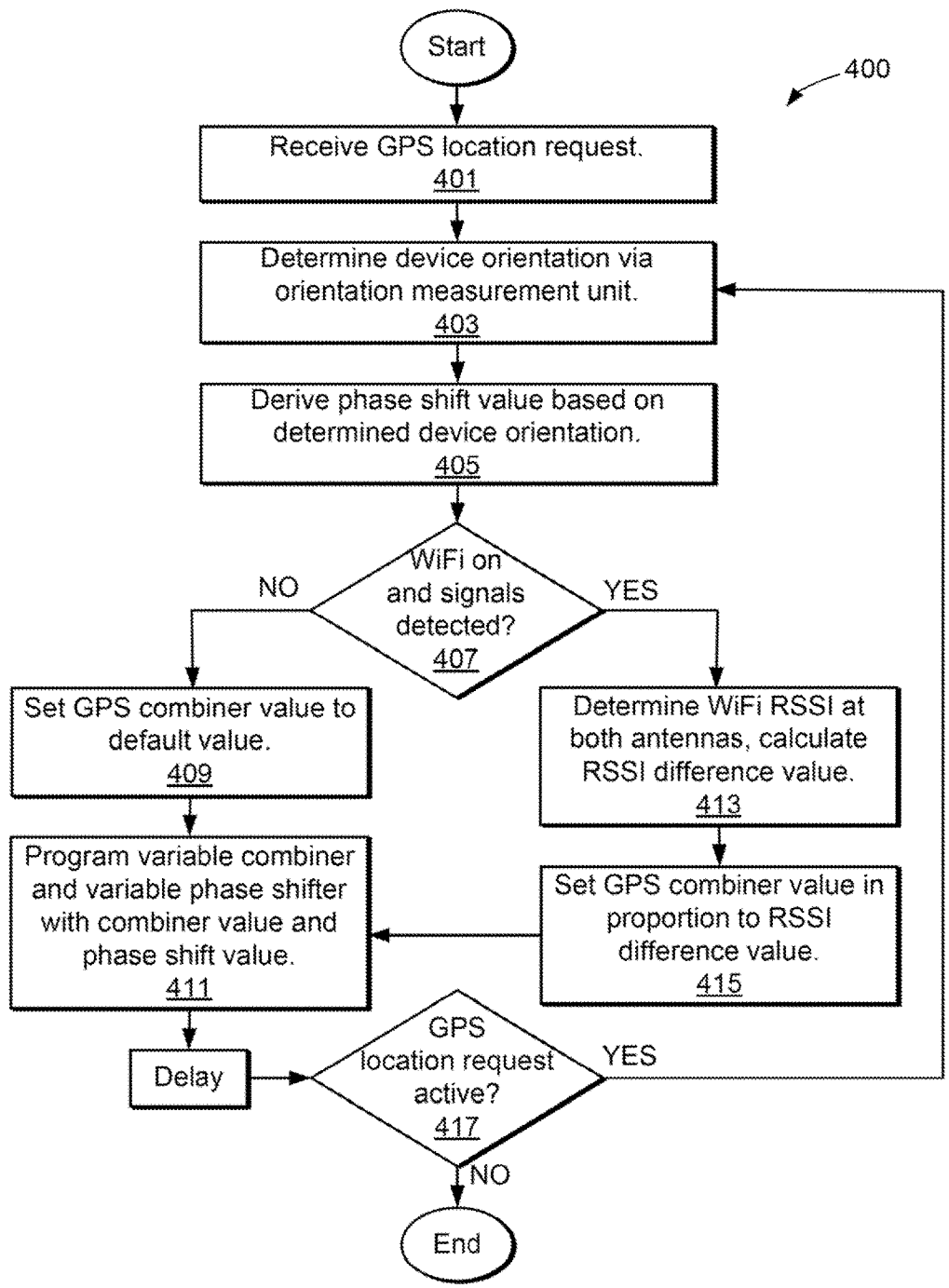
FIG. 4 is a flowchart showing an example process of multiband, multiport antenna operation in accordance with an embodiment of the described principles.

The operation of the system of FIG. 3 is shown in greater detail in the flowchart of FIG. 4. The process 400 begins at stage 401, wherein the main processor 311 receives a GPS location request, e.g., from an application. The processor 311 determines a device orientation at stage 403 via the orientation-measurement unit 319. At stage 405, the processor 311 derives a phase-shift value based on the determined device orientation.

The processor 311 determines at stage 407 whether the device's WiFi facilities are powered on and WiFi signals are being or have been detected within a predetermined time frame such as 10 milliseconds. If the WiFi facilities of the device are not on, or if the WiFi facilities are on but no signal is detected, then the process 400 flows to stage 409, wherein the processor 311 sets the GPS-combiner value to a default value such as 50% (i.e., the incoming signals are combined equally). Continuing to stage 411, the processor 311 programs the variable combiner 313 and the variable phase shifter 315 respectively with the combiner value and the phase-shift value.

Returning to stage 407, if the processor 311 determines at this stage that the device's WiFi facilities are powered on and WiFi signals are being or have been detected within the predetermined time frame, then the process 400 flows to stage 413, wherein the processor 311 determines the WiFi received signal-strength indicator ("RSSI") at both antennas 301, 303 and determines an RSSI-difference value.

The processor 311 then determines a GPS-combiner value at stage 415 based on the RSSI difference value, e.g., by setting the GPS-combiner value proportional to the RSSI-difference value or from a table or function stored in memory. From stage 415, the processor 311 programs the variable combiner 313 and the variable phase shifter 315 respectively with the combiner value and the phase-shift value at stage 411.

Regardless of whether the process 400 arrived at stage 411 via stage 409 or stage 415, the processor 311 implements a short delay before proceeding to stage 417. At this stage, the processor determines whether the GPS location request is still active. If the request is no longer active, then the process 400 terminates. Otherwise, the process 400 returns to stage 403 to reiterate the setting of the variable combiner 313 and the variable phase shifter 315.

In this way, the device effectively uses differential WiFi RSSI to mitigate differential antenna detuning and uses phase shifting in concert with orientation detection to steer GPS reception for improved reception. It will be appreciated that the order or details of the illustrated process 400 may be modified without departing from the disclosed principles. For example, orientation detection may occur simultaneously with or even after detuning detection. Similarly, the phase-shift and combiner values may be applied sequentially rather than simultaneously.

Figure 5:
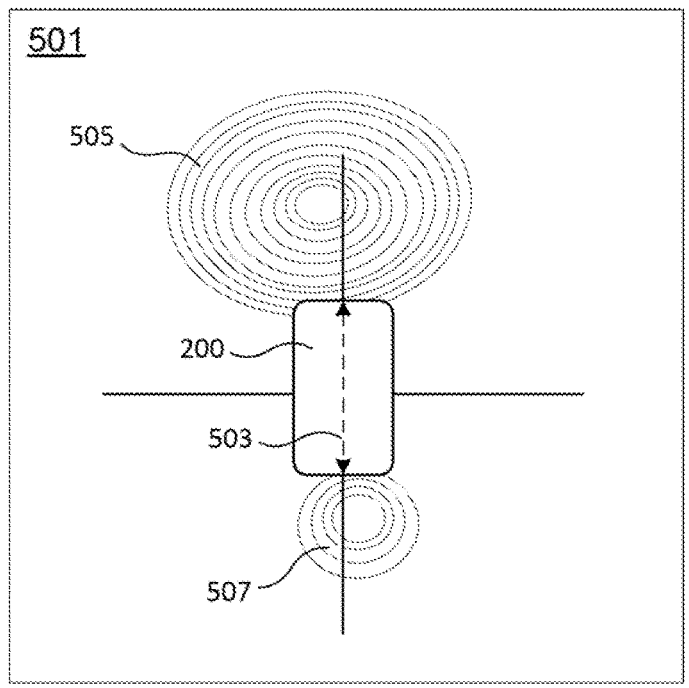
FIG. 5 shows a set of simplified signal-strength plots illustrating the effect of phase-shift steering on GPS signal strength in a free-space condition in accordance with an embodiment of the described principles.
Figure 5:
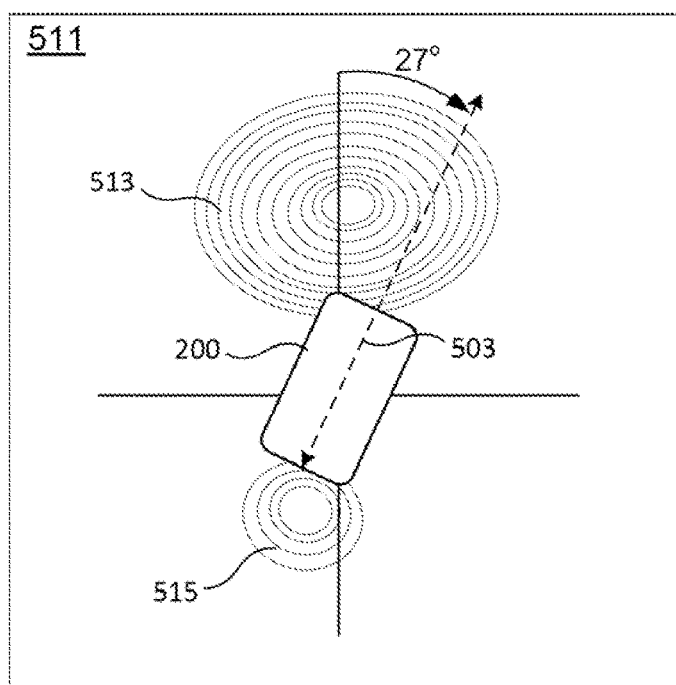

The described principles have been modeled by the inventors and show significant improvement in radiation patterns compared to those of a single GPS antenna as well as compared to the use of multiple GPS antennas without steering or differential tuning FIG. 5 shows simplified GPS signal-strength plots for a free-space device model illustrating the effect of orientation-based phase shifting on the device's upper hemisphere GPS reception pattern. The first plot 501 shows GPS signal-strength patterns with the device 200 oriented vertically with respect to its major axis 503.

As can be seen, the upper hemisphere pattern 505 dominates and is oriented skyward. There is also a minor lower hemisphere pattern 507. Less significant portions of the signal-strength pattern emanate horizontally but have been omitted for clarity. In this orientation in free-space conditions, the combiner value is centered (50/50) and the phase-shift value is zero.

The second plot 511 shows a GPS signal-strength pattern with the same device 200, except that the device 200 is now oriented 27° from vertical with respect to its major axis 503. In this orientation, again in free-space conditions, the combiner value is still centered but the phase-shift value has been adjusted to maximize the upper hemisphere pattern. In particular, the phase-shift value has been shifted by 60° from its nominal value.

As with the first plot 501, the upper hemisphere pattern 513 of the second plot 511 is substantially vertical, although now it is shifted very slightly in the direction of rotation. The minor lower pattern 515 remains essentially unmoved in the device frame of reference.

Figure 6:
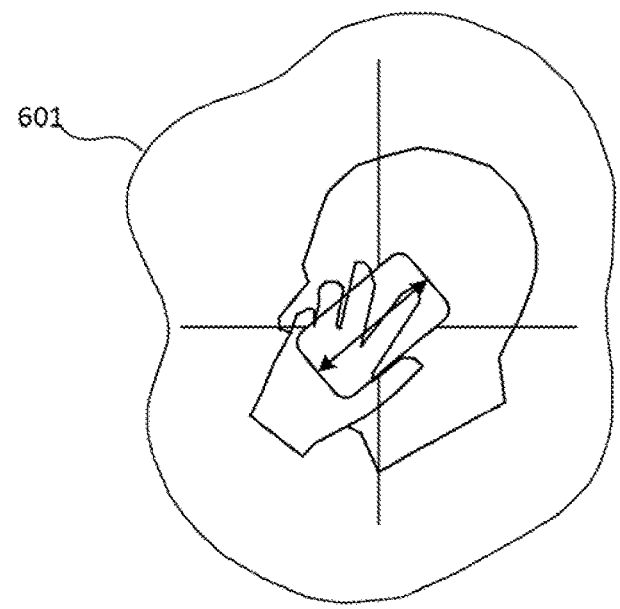
FIG. 6 shows a set of simplified signal-strength plots illustrating the effect of phase-shift steering and variable signal combination on GPS signal strength in a hand-held device in accordance with an embodiment of the described principles.
Figure 6:
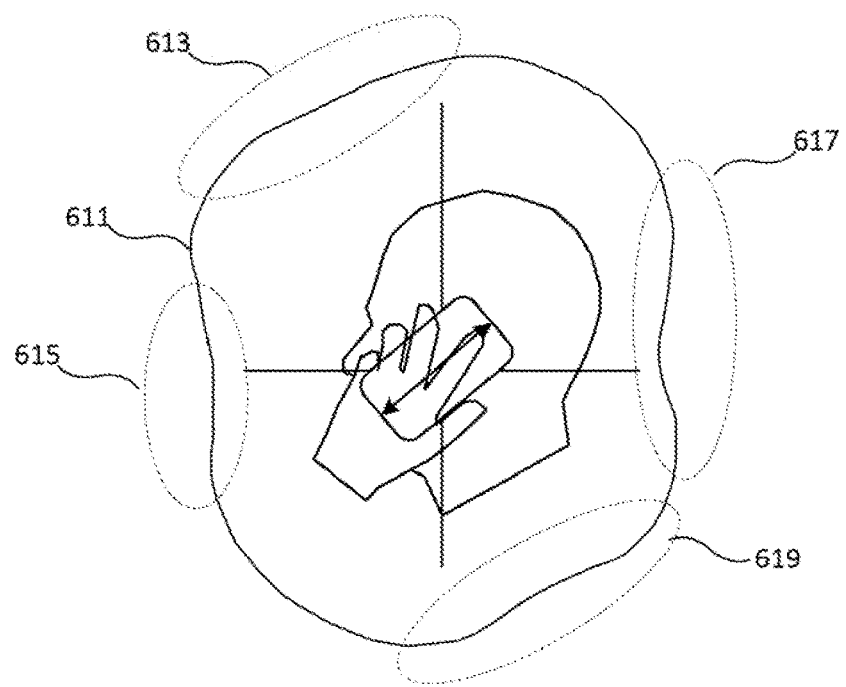

Modeling the radiation pattern of the device 200 in a non-free-space environment shows that the disclosed principles allow mitigation of antenna detuning to some extent as well. FIG. 6 shows simplified GPS reception-strength patterns illustrating the effect of orientation-based phase shifting and detuning mitigation on the device's upper hemisphere GPS-reception pattern while the device 200 is hand-held at the user's ear.

The upper plot shows a GPS signal-strength pattern 601 modeled while the device 200 is hand-held at the user's ear (device reference number omitted in this view for clarity). The first plot does not reflect any correction of the GPS pattern via variable combining but does reflect steering of the GPS pattern via phase shifting (nominal minus 60° due to device tilt). The second plot shows the resulting radiation pattern 611 with the device 200 in the same position but with GPS-detuning correction applied in addition to the phase-shift steering. The RSSI-based variable signal combination in this example accounts for the differential effect of the user's hand and head on the WiFi antennas of the device 200.

As can be seen, the phase shift-only pattern 601 exhibits a substantial upper hemisphere component but also includes certain low spots. The addition of correction via variable signal combination based on differential RSSI supplements certain low spots 613, 615 in the forward upper direction at the expense of aggravating other low spots 617, 619 in the lower and rearward directions. Since the upper hemisphere pattern is the most important for GPS reception, it can be seen that the addition of variable combining serves to improve GPS reception further in addition to the improvement yielded by phase-shift steering.

It will be appreciated that various systems and processes for improving geolocation-antenna operation have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

Moreover, while the description here is with reference to WiFi and GPS antenna systems, it is not intended to be limited to such. For example, the system could use a long-term evolution cellular system in combination with the GPS location or a WiFi system in combination with directional 5G systems.

Also, other sensors, e.g., accelerometers, driving-mode detectors, etc., could be used to determine device context, and alternative phase and combiner values can be used to steer the radiation pattern in a different direction than the skyward direction, e.g., in a horizontal plane pointing to a window.

We claim:

1. A portable electronic communication device comprising:
  a first antenna responsive to WiFi and to Global Positioning System ("GPS") transmissions and a first diplexer to separate GPS transmissions received at the first antenna from WiFi transmissions received at the first antenna;
  a second antenna responsive to WiFi and to GPS transmissions and a second diplexer to separate GPS transmissions received at the second antenna from WiFi transmissions received at the second antenna; and
  a processor configured to determine a first WiFi received signal-strength indicator ("RSSI") associated with the first antenna and a second WiFi RSSI associated with the second antenna and to selectively combine the GPS transmissions received at the first antenna with the GPS transmissions received at the second antenna based on the first RSSI and on the second RSSI.

2. The device of claim 1 wherein the processor is configured to selectively combine the GPS transmissions received at the first antenna with the GPS transmissions received at the second antenna in a ratio substantially related to a ratio of the first RSSI and the second RSSI.

3. The device of claim 2 wherein the processor is configured to combine the GPS transmissions received at the first antenna with the GPS transmissions received at the second antenna in a nominal proportion when the first RSSI and the second RSSI are substantially equal to a nominal value.

4. The device of claim 2 wherein the processor is further configured to combine the GPS transmissions received at the first antenna with the GPS transmissions received at the second antenna in a predetermined default proportion when the first RSSI and the second RSSI are substantially zero.

5. The device of claim 1 further comprising an orientation-sensor system for providing an indication of an orientation of the device, wherein the processor is further configured to selectively introduce a phase shift between the GPS transmissions received at the first antenna and the GPS transmissions received at the second antenna based on the orientation of the device prior to combining the GPS transmissions.

6. The device of claim 5 wherein the first antenna and second antenna provide a GPS reception pattern having an upper portion and a lower portion and wherein the direction and magnitude of the phase shift are selected to increase the upper portion of the GPS reception pattern.

7. The device of claim 5 wherein the orientation-sensor system includes at least one of an accelerometer, a gyroscope, and a gravitometer.

8. A method of improving Global Positioning System ("GPS") reception in a portable electronic communication device having first and second antennas responsive to WiFi and GPS transmissions, the method comprising:
  receiving a WiFi transmission at the first antenna and determining a first associated received signal-strength indicator ("RSSI");
  receiving the WiFi transmission at the second antenna and determining a second associated RSSI;
  receiving a GPS transmission at the first antenna and the second antenna and producing respective first and second GPS signals; and
  selectively combining the first and second GPS signals based on the first RSSI and on the second RSSI.

9. The method of claim 8 wherein selectively combining the first and second GPS signals based on the first RSSI and on the second RSSI comprises combining the first and second GPS signals in a ratio substantially equal to the ratio of the first RSSI and the second RSSI.

10. The method of claim 8 wherein selectively combining the first and second GPS signals based on the first RSSI and on the second RSSI comprises combining the first and second GPS signals in equal proportion when the first RSSI and the second RSSI are substantially equal.

11. The method of claim 8 wherein selectively combining the first and second GPS signals based on the first RSSI and on the second RSSI comprises combining the first and second GPS signals in a predetermined default proportion when the first RSSI and the second RSSI are substantially zero.

12. The method of claim 8 further comprising measuring an orientation of the device and selectively introducing a phase shift between the first and second GPS signals based on the measured orientation prior to combining the first and second GPS signals.

13. The method of claim 12 wherein the first antenna and second antenna exhibit a GPS-reception pattern having an upper portion and a lower portion, and wherein introducing a phase shift between the first and second GPS signals based on the measured orientation comprises selecting the phase shift to increase the upper portion of the GPS reception pattern.

14. The method of claim 12 wherein measuring an orientation of the device comprises reading data from one of an accelerometer, a gyroscope, and a gravitometer.

15. A method for improving Global Positioning System ("GPS") performance in a portable electronic device having multiple antennas, the method comprising:
   comparing WiFi signal strength at a first antenna of the device to WiFi signal strength at a second antenna of the device;
   based on the comparison, setting a combiner ratio;
   collecting a GPS transmission at the first antenna to generate a first GPS signal and at the second antenna to generate a second GPS signal;
   combining the first GPS signal and the second GPS signal in a ratio defined by the combiner ratio to produce a combined GPS signal; and
   determining a location of the device based on the combined GPS signal.

16. The method of claim 15 wherein the combiner ratio is 1:1 when the WiFi signal strength at the first antenna is substantially equal to the WiFi signal strength at the second antenna.

17. The method of claim 15 wherein the combiner ratio is set to a predetermined default value when the WiFi signal strength at the first antenna and the WiFi signal strength at the second antenna are substantially zero.

18. The method of claim 15 further comprising measuring an orientation of the device and selectively introducing an orientation-based phase shift between the first GPS signal and the second GPS signal prior to the step of combining.

19. The method of claim 18 wherein the first antenna and second antenna exhibit a GPS reception pattern having an upper portion and a lower portion and wherein introducing an orientation-based phase shift comprises selecting the phase shift to increase the upper portion of the GPS reception pattern based on the device orientation.

20. The method of claim 18 wherein measuring an orientation of the device comprises reading data from one of an accelerometer, a gyroscope, and a gravitometer.

* * * * *